Dec. 8, 1931.   H. H. W. VAN EYK ET AL   1,834,987
AUTOMATIC CONTROL OF HUMIDITY OF AIR
Filed Oct. 1, 1928   3 Sheets-Sheet 3

Patented Dec. 8, 1931

1,834,987

UNITED STATES PATENT OFFICE

HOYTE HENDRIK WILLEM VAN EYK, OF DEVENTER, AND JOHAN PHILIP PFEIFFER, OF DELFT, NETHERLANDS, ASSIGNORS, BY MESNE ASSIGNMENTS, TO THE BROWN INSTRUMENT COMPANY, OF PHILADELPHIA, PENNSYLVANIA, A CORPORATION OF PENNSYLVANIA

AUTOMATIC CONTROL OF HUMIDITY OF AIR

Application filed October 1, 1928, Serial No. 309,675, and in the Netherlands June 26, 1928.

This invention relates to psychrometric controlling devices or devices for automatically controlling the humidity of air.

For automatically controlling a heating apparatus combined with an air-moistening-installation controlling devices are used in the various branches of industry consisting of a dry and a wet bulb thermometer combined with indicators and controlling arms, said devices reacting on the heating apparatus in such a way that the temperature is kept constant, and at the same time reacting on the air-moistening-installation in such a way that the relative humidity does not fluctuate with said temperature.

These controllers are also constructed as recorders. The indicator of the dry bulb thermometer records the temperature and the position of the indicator of the wet bulb thermometer is also registered. From both indications the relative humidity may subsequently be calculated.

For automatic control the devices are equipped with two controlling arms for the indicators of the dry and wet bulb thermometers respectively. These controlling arms are set at the dry and wet temperature required and the controller is put into action when the indicators pass the controlling arms.

A new construction for the automatic control of the relative humidity of air in closed rooms can take place independently of the temperature has now been found, in which use is made of a mechanical coupling between the indicator of the dry bulb thermometer and the controlling arm cooperating with the indicator of the wet bulb thermometer in such a way that when the position of the indicator of the dry bulb thermometer is changed, the angle formed by the said indicator and the said controlling arm undergoes a psychrometric change of angle, i. e. a change of angle at which the angle, with any position of the indicator of the dry bulb thermometer, is proportional to the psychrometric difference corresponding with said position and a certain relative humidity.

The coupling may be mounted either upon devices already well-known—in such a case the controlling arm for the indicator of the dry bulb thermometer may be removed—or upon devices specially provided for the purpose, by means of suitable mechanical connections, for example, a linkage, a gear-system, a chain-system, rope-pulleys, levers, friction-connections or combinations of these systems.

The invention broadly contemplates the provision of a device operating in response to dry bulb temperatures which will position another device relative thereto proportionately to the wet bulb temperature corresponding to the dry bulb temperature for a given humidity throughout the range of the dry bulb temperatures involved. Other advantages and objects of the present invention will appear in the following detailed description taken in connection with the accompanying drawings in which.

Figure 1:
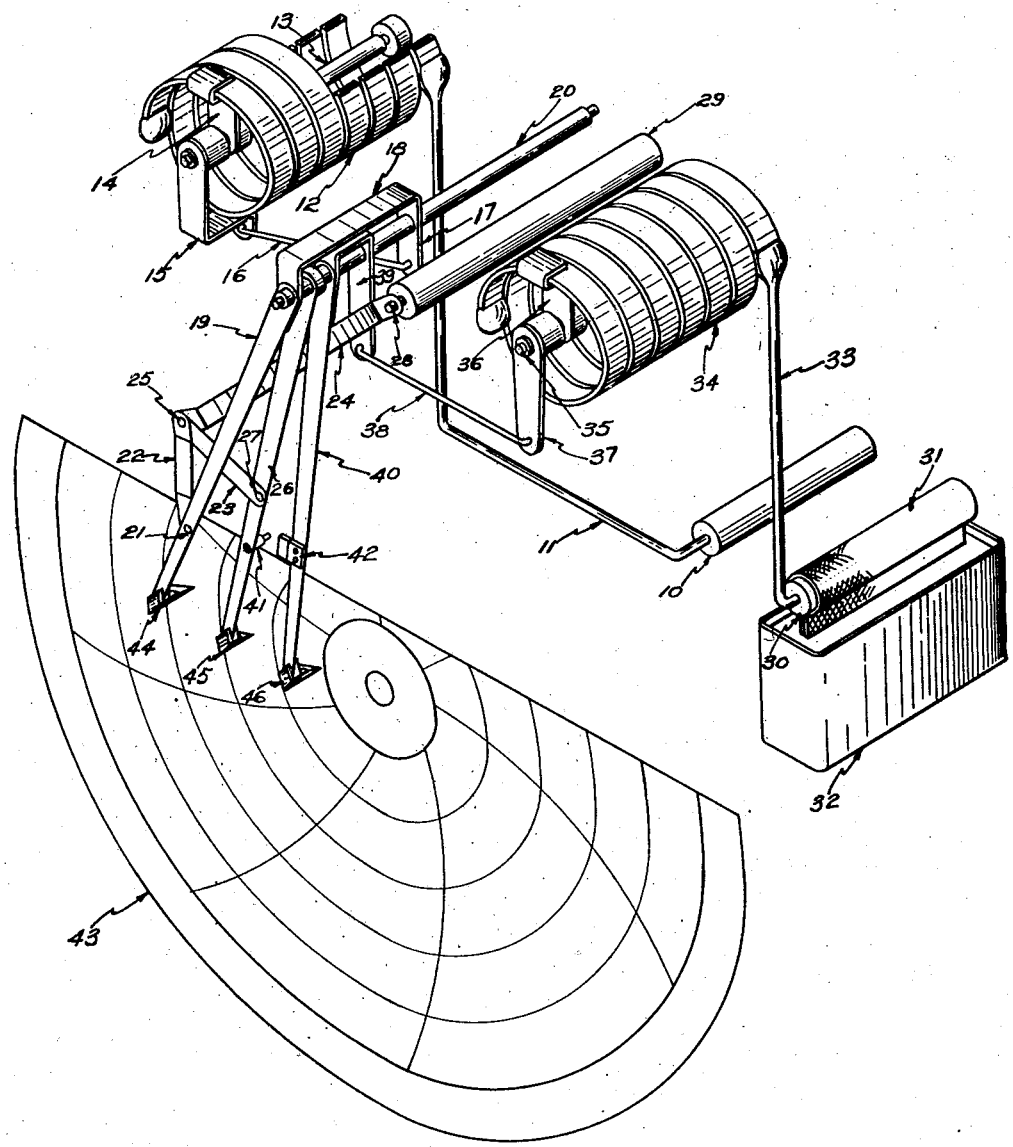
Fig. 1 is a view in prospective showing the operative parts of a device embodying the principles of this invention.

Referring to Fig. 1 of the drawings, 10 indicates the thermo-responsive element exposed to the atmosphere, the humidity of which is to be controlled. Preferably the bulb 10 contains a thermo-expansive fluid which may expand through tube 11 connecting the bulb 10 and the Bourdon tube helix 12. Expansion of the fluid in bulb 10 causes the helix 12 to expand or unwind in the well known manner.

The helix 12 is rigidly mounted in the instrument casing (not shown) and is connected to the rotatable shaft 13 by means of the arm 14. The shaft 13 has a radius arm 15 fixed thereon and a link 16 connects the radius arm 15 with an arm 17 of the U shaped frame 18, which drives the dry bulb pointer 19 fixedly attached thereto. The frame 18 is mounted for rotation about the shaft 20, being held in position longitudinally thereof by collars or in any other suitable manner.

The dry bulb temperature indicating member 19 has pivoted thereto, as shown at 21, a link 22 pivoted at its other extremity to links 23 and 24, as shown at 25. The link 23 at its other extremity is pivoted to the arm or member 26 as shown at 27. The arm or member 26 is pivoted for rotation about the shaft 20 or about any other shaft coaxial with the center of rotation of the arm or member 19. Inasmuch as the arms 19 and 26 are connected by links 22 and 23 pivoted together at 25, the arm 26 will follow the motion of the arm 19 in a manner or according to a law determined by the length of the link 24 and its fixed center of rotation. The link 24 is pivoted as shown at 28 on the post 29 rigidly fixed to the casing or frame of the instrument. The center of rotation 28 is off center with respect to the center of rotation of the arms 19 and 26.

As will be obvious from an inspection of the drawings, an increase in the temperature of the dry bulb 10 will cause the helix 12 to expand, thereby rotating crank arm 15 in a clockwise direction and causing a corresponding rotation of the arm 17. Accordingly the pen arm 19 is driven in clockwise rotation with increasing temperature. As the pen arm 19 moves in a clockwise or up-scale direction, the arm or member 26 follows the arm 19. The angle between arms 19 and 26 varies with the motion of the arm 19 in a manner determined by the length of the link 24 and its fixed center of rotation. As will be clear from an inspection of Fig. 1, the angle between arms 19 and 26 will increase as the pen arm 19 moves up scale and will decrease when the pen arm 19 moves down scale to indicate decreasing temperature. As will be later described, the arrangement and proportioning of parts in the link system herein described is such that the angle between arms 19 and 26 will, at various positions of the arm 19, represent or be directly proportional to the drop in the wet bulb temperature for a constant humidity throughout the temperature range.

Conveniently located with respect to the dry bulb thermoresponsive member 10 is positioned a thermoresponsive member 30 surrounded with wick 31 dipping into a tank of water 32. As is well understood by those skilled in the art, evaporation of moisture from the wick 31 causes the bulb 30 to be at a lower temperature than the bulb 10, and the difference in temperature is proportional to the degree to which the surrounding atmosphere is saturated with moisture. For a given degree of saturation or a constant humidity, the difference in temperatures between bulb 10 and bulb 30 will increase with increasing temperature, and decrease with decreasing temperatures of the surrounding atmosphere. The bulb 30 contains a thermoexpansive fluid, the expansions and contractions of which are transmitted through tube 33 to the Bourdon tube 34, rigidly mounted in any suitable frame or casing of the instrument. With increasing temperatures and corresponding expansion of the thermoexpansive fluid the Bourdon tube is caused to expand or unwind. The movement of the helix 34 is transmitted to shaft 35 by means of a radius arm 36. The shaft 35 has rigidly connected thereto, the crank arm 37 joined by the link 38 to crank arm 39 rigidly attached to pen or indicating member 40. The crank arm 39 and pen 40 are mounted for rotation about the shaft 20 and held thereon from longitudinal displacement by collars or any other suitable means. As will be apparent from the construction as shown in Fig. 1 of the drawings, the increasing temperatures of the bulb 30 will cause the indicating member or pen arm 40 to move in a clockwise direction or up scale.

For any given atmospheric temperature and percent humidity, the pen arms of indicating members 19 and 40 will occupy positions at an angle with respect to each other, which angle is determined by the temperature and the percent humidity. If the humidity of the atmosphere about the bulbs 10 and 30 be the desired humidity for which the instrument has been adjusted, the pen arm or indicating member 40 will be in alignment with the arm or member 26 regardless of the temperature. Any deviation of the humidity of the atmosphere surrounding the bulbs 10 and 30, from the normal humidity for which the instrument is adjusted, will cause the pen arm or indicating member 40 to move away from the arm 26, which may conveniently be called the control arm. A decrease of humidity below the normal, will cause the pen or indicating member 40 to move down scale relative to the control arm 26. On the other hand, an increase in humidity above the normal will cause the indicating arm 40 to move up scale relative to the control arm 26.

The control arm 26 and the indicating member 40 may be provided with electrical contacts 41 and 42 respectively, connected to any well known system for controlling humidity (not shown). The contacts 41 and 42 cooperate with the control system so that when the control arm 26 and wet bulb temperature indicating member 40 are in alignment, the humidity controlling system or humidifying device will be inoperable.

When the control arm 26 and wet bulb temperature indicating arm are out of alignment, the humidifying device will be actuated to change the humidity to that desired. In lieu of the particular contact making system herein disclosed, a contact table such as that shown in Fig. 2 of the patent of Brown 1,443,165, issued January 23, 1923, for electric signalling and controlling apparatus, may be employed, or any other of the many well known types of contact tables may be employed for effecting the control of the humidifying system by the cooperation of the control arm 26 and the wet bulb indicating member 40. The chart 43 driven by any suitable constant speed motor, may be provided for recording the positions of the members 19, 26 and 40, which correspondingly may be provided with pens 44, 45 and 46, cooperating with chart 43.

Figure 2:
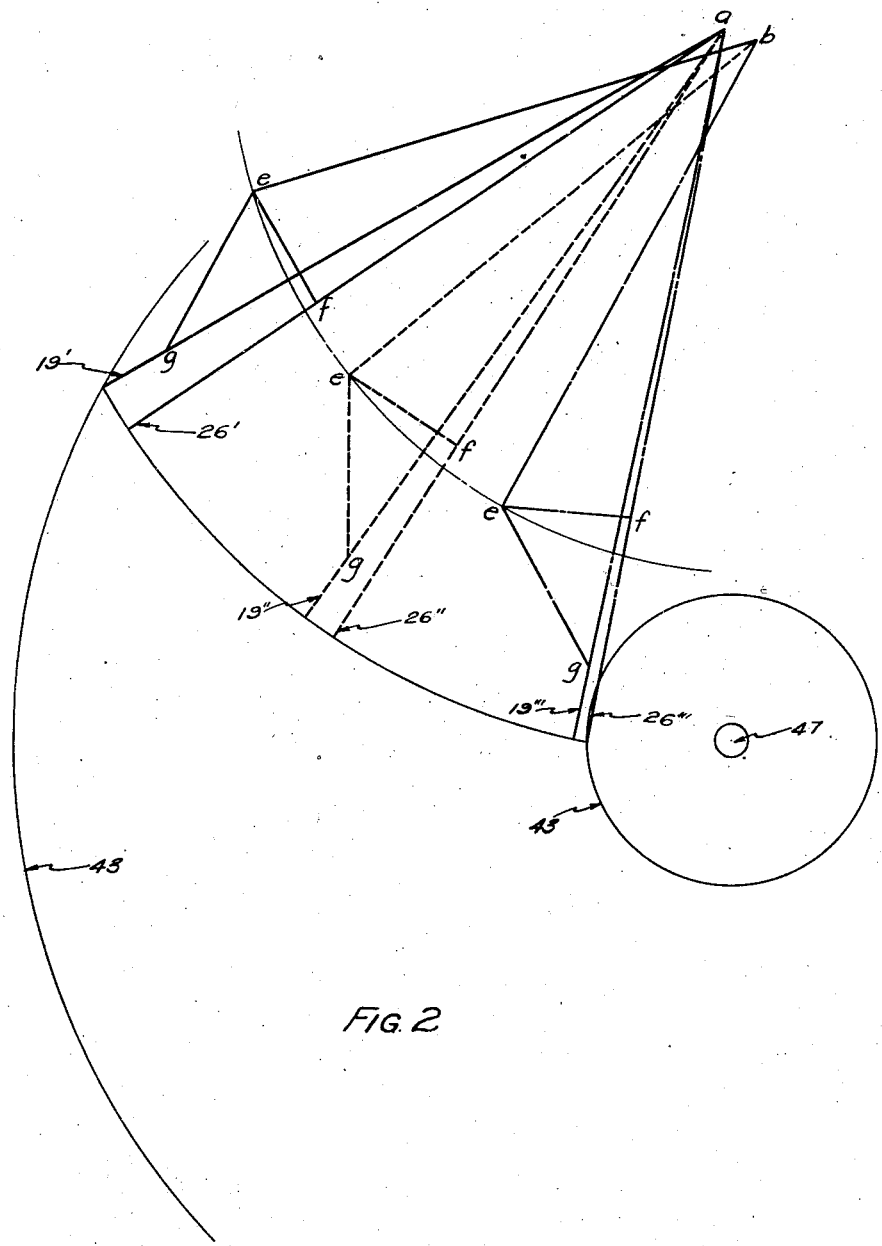
Fig. 2 is a diagram illustrating the manner of constructing the device of Fig. 1.
Figure 3:
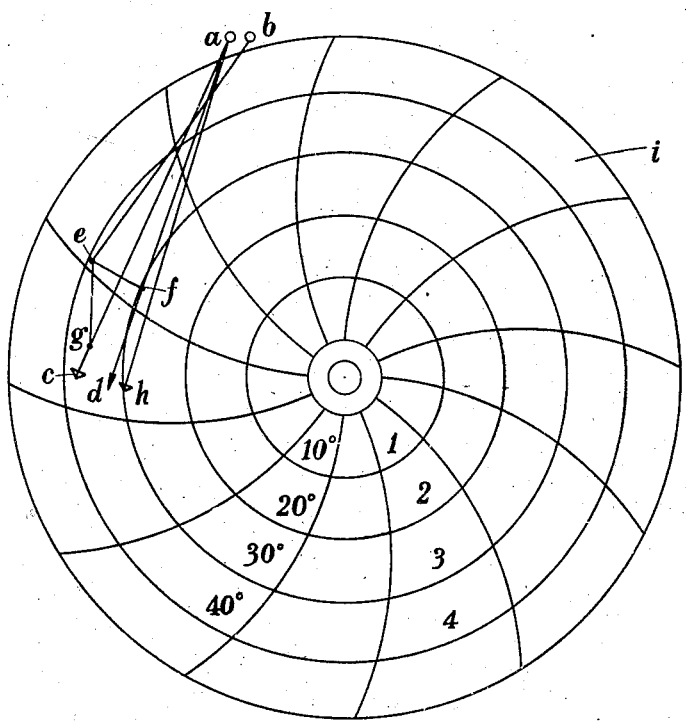
Fig. 3 is a diagrammatic view showing the geometrical relation of the essential parts of this invention.

As herein above pointed out, the linkage system joining the control arm 26 and the dry bulb temperature indicating member 19 must be adjusted or arranged so that the position of the control arm 26 relative to the indicating member 19 will, for all temperatures correspond to the wet bulb temperature at a given constant humidity. One way in which the various parts of the linkage system may be adjusted, is illustrated in Fig. 2 of the drawings. In that figure the chart is indicated at 43 in outline, the center of the chart being at 47. The center of rotation of the members 19, 26 and 40 is indicated at $a$. The dry bulb temperature indicating member 19 is indicated diagrammatically at $19^1$ in one position, at $19^{11}$ at another, and at $19^{111}$ in a third position. The three positions of the dry bulb temperature indicating arm are selected at temperatures for which the most accurate control of humidity is desired. The control arm 26 is indicated diagrammatically in the three positions corresponding to those of the dry bulb temperature indicating member 19 and are referred to as $26^1$, $26^{11}$, and $26^{111}$. The distance between the axle 20 and the pivot point 21 indicated as $a$—$g$ in Fig. 2, and the distance between the axle 20 and the pivot point 27 indicated as $a$—$f$ in Fig. 2, and the distance between pivot points 21 and 25, and 27 and 25, indicated respectively as $g$—$e$ and $f$—$e$ in Fig. 2 of the drawings, are all selected to suit the convenience of construction of the instrument within practical limits and may be regarded as the independent variables. The axis of pivot 28 is indicated at $b$, Fig. 2 of the drawings. The length $e$—$b$ and the position of the center $b$ are to be determined.

In order to determine the length of $e$—$b$ and the position of the center $b$ (the link system during adjustment not being confined by fixing the center $b$), the dry bulb temperature indicating member 19 is positioned at a particular temperature as shown at $19^1$ in Fig. 2. The control arm 26 is then manually adjusted to a position as shown at $26^1$ in the Fig. 2, which corresponds to the wet bulb temperature for the desired humidity and for the particular dry bulb temperature indicated by the position $19^1$. When the positions $19^1$ and $26^1$ are thus fixed, the links $e$—$g$ and $e$—$f$ take up a definite position and the point $e$ is fixed. The dry bulb indicating member 19 is adjusted to a second temperature position as indicated at $19^{11}$ in Fig. 2, and the control arm is then manually adjusted to a position $26^{11}$, which corresponds to the position of the wet bulb temperature indicator for the desired humidity and at the temperature position $19^{11}$ of the dry bulb indicating member 19. Again the links $e$—$g$ and $e$—$f$ take up a definite position $e$. The same series of operations is performed a third time with the dry bulb temperature indicating member 19 at the position $19^{111}$, as shown in Fig. 2, again determining a third position of the point $e$. The three positions of the point $e$ thus determined, fix a circle passing through those points and the length $e$—$b$ is then selected as the radius of that circle and the center point is selected as the center of that circle, as will be apparent from the above description. When the dry bulb temperature indicating member 19 moves, the control arm 26 is caused by the link system to follow the indicating member 19 in such a manner that at the various positions of the dry bulb temperature indicating member 19, the control arm 26 will assume a position corresponding to the wet bulb temperature for the desired humidity, and corresponding to the dry bulb temperature. While the movement of the control arm may depart slightly from the theoretical psychrometric law at points intermediate to those for which the system is determined, yet the control arm follows that law with sufficient accuracy for all practical purposes, and since the system may be so determined as to be theoretically accurate at three chosen points, it is possible to select those points at the temperatures for which control is desired.

$a$—$c$ is the indicator of a dry bulb thermometer, $a$—$d$ is the controlling arm cooperating with the indicator arm $a$—$h$ of the wet bulb thermometer in the known manner in controlling the humidity of the surrounding air.

According to the present invention, for example, the indicator $a$—$c$ and the controlling arm $a$—$d$ are coupled with the coupling-rods $e$—$g$ and $e$—$f$, which meet at point $e$ on a suspension-rod $b$—$e$, which at point $b$ has a fixed centre of rotation. So the points $a$ and $b$ are fixed centres of rotation, whereas the points $e$, $f$ and $g$ are movable ones. The lengths $a$—$g$, $a$—$f$, $g$—$e$ and $f$—$e$ are taken within practical limits. The length $e$—$b$ and the position of $b$ are determined from three positions of the indicator $a$—$c$ and the corresponding positions of a—d for a certain relative humidity. For each relative humidity wanted, a different position for b and a different length of e—b are necessary. For a percentage of humidity of, for example, 80% according to the construction just described, the following lengths are found to be satisfactory:

The distance a to centre of diagram = 140 mm.
a—g = 128 mm.
a—f = 98 mm.
g—e = 36 mm.
f—e = 25.5 mm.
e—b = 105 mm.
The distance b to centre = 138 mm.
And a—b = 6.8 mm.

The device according to the invention now works as follows:

While the above lengths and positions constitute one specific example of a construction embodying the principle of this invention, it is to be understood that the invention is in no way limited to those particular dimensions.

On the dial $i$, the indicator of the dry bulb thermometer a—c indicates, in a well-known manner, the prevailing temperature which is read from the temperature-circles 1—4.

The mechanical coupling automatically brings the controlling arm for the indicator of the wet bulb thermometer a—d to a certain temperature position below which the indicator of the wet bulb thermometer a—h is not allowed to come, for if the latter arrives at said position the moistening-installation is put in operation in a well-known manner, for example, by an electric contact, or by air-pressure, hydraulic-pressure or an oil-pressure-relay, combined with a servo-motor or not and the operation is continued until the humidity of the air is increased to such a degree that the indicator of the wet bulb thermometer (a—h) again turns away from the aforesaid temperature position, which is indicated by the controlling arm a—d, owing to which the moistening-apparatus is stopped again.

Thus with any given temperature and consequently with any given position of the indicator a—c the same degree of relative humidity is constantly maintained, as the corresponding psychrometric difference wanted is automatically adjusted.

What we claim is:—

1. A psychrometric controlling device comprising a first indicator arm for indicating the temperature registered by the dry bulb thermometer, a second indicator arm for indicating the temperature registered by the wet bulb thermometer, a controlling arm adapted to co-operate in the known manner with said second indicator arm in controlling the relative humidity of the surrounding air by virtue of its position in relation to said second arm and a mechanical coupling between said first indicator arm and said controlling arm adapted to vary the psychrometric angle between said first indicator arm and said controlling arm so as to cause said controlling arm to co-operate with said second arm to keep the relative humidity of the surrounding air at a predetermined constant value in all positions of said first indicator arm.

2. A psychrometric controlling device according to claim 1, wherein said mechanical coupling comprises a first rod having a stationary pivot at one end, a second rod connected at one end to the free end of said first rod and at the other end to said controlling arm and a third rod also connected at one end to the free end of said first rod and at the other end to said first indicator arm.

3. In combination, dry bulb temperature responsive means, wet bulb temperature responsive means, a control arm, mechanism interconnecting the dry bulb temperature responsive means and the control arm for adjusting the control arm relative to the dry bulb temperature responsive means according to the psychrometric law for constant humidity, said mechanism being driven solely by the dry bulb temperature responsive means, said wet bulb temperature responsive means being arranged for cooperation with the control arm to effect a control action.

4. A pivotally mounted member, means responsive to dry bulb temperature for moving the member, a second member pivotally mounted about the same axis as the first mentioned member, a link pivoted to the first member, and a second link pivoted to the second member, said links being joined pivotally at their other extremities, a third link pivotally joined to the first two mentioned links at their common pivot, means for pivotally supporting the third link about a fixed axis of rotation at a point distant from the common pivot between the three links, said fixed axis of rotation being offset from the axis of rotation of the two members, the link system being proportioned and arranged to position the second member relative to the first mentioned member according to the psychrometric law for constant humidity.

5. In combination, a dry bulb thermometer, a pivoted control member, means operated by the thermometer to position the member according to the wet bulb temperature corresponding to the dry bulb temperature and a predetermined humidity, a wet bulb thermometer, a control means pivoted coaxially with said member, said control means being operated by the wet bulb thermometer and arranged to cooperate with the member to effect a control action.

6. A recording controller having a dry bulb thermometer, a wet bulb thermometer, a recording element operated by the dry bulb thermometer, control means positioned by said recording element according to the wet bulb temperature corresponding to the dry bulb temperature and a predetermined humidity, and a control element operated by the wet bulb thermometer and arranged to cooperate with the control means to effect a control action.

7. A circular chart recording controller having a wet bulb thermometer, a dry bulb thermometer, a first recording pen operated by the dry bulb thermometer, a second recording pen operated by the wet bulb thermometer, a control member, said pens and control member being pivoted about the same axis, a link system joining the first pen and the member for positioning the member according to wet bulb temperature corresponding to the dry bulb temperature and a predetermined humidity, and control means associated with the second pen arranged for cooperation with the member to effect a control action.

8. A circular chart recording controller having a wet bulb thermometer, a dry bulb thermometer, a first recording pen operated by the dry bulb thermometer, a second recording pen operated by the wet bulb thermometer, a control member, said pens and control member being pivoted about the same axis, a link system having a fixed axis of rotation offset from the first mentioned axis, said link system joining the first pen and the member for positioning the member according to wet bulb temperature corresponding to the dry bulb temperature and a predetermined humidity, and control means associated with the second pen arranged for cooperation with the control member to effect a control action.

In testimony whereof we have signed our names to this specification.

HOYTE H. W. van EYK.
JOHAN PH. PFEIFFER.